Frederic William Newell
Raymond John Saunders
Inventors

By Morrison, Kennedy & Campbell
Attorneys

Jan. 16, 1968    F. W. NEWELL ET AL    3,364,006
OPPOSED BLASTHEAD APPARATUS FOR TOUGHENING SHEETS
OF GLASS WITH SPACED VERTICAL DEFLECTING SHIELDS
Filed June 10, 1964      4 Sheets-Sheet 2
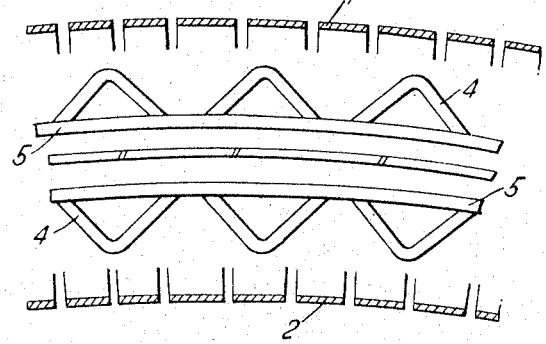
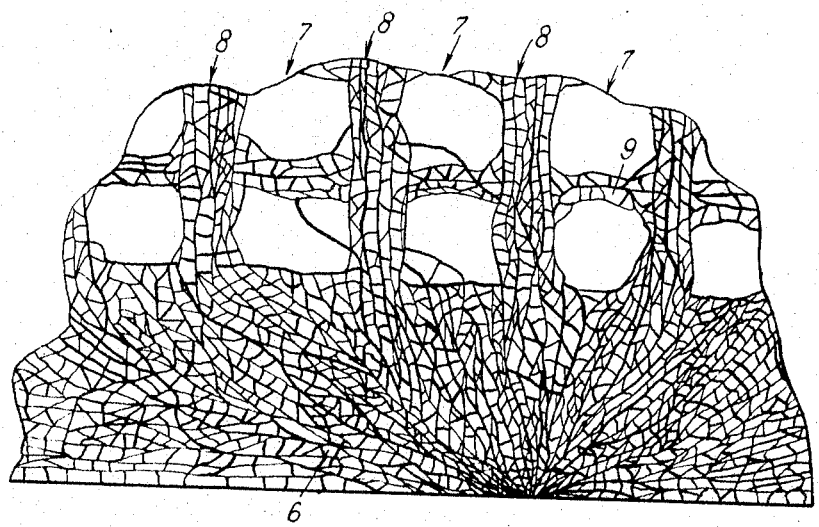

Jan. 16, 1968     F. W. NEWELL ET AL     3,364,006
OPPOSED BLASTHEAD APPARATUS FOR TOUGHENING SHEETS
OF GLASS WITH SPACED VERTICAL DEFLECTING SHIELDS
Filed June 10, 1964     4 Sheets-Sheet 4

Frederic William Newell
Raymond John Saunders
Inventors

By Morrison, Kennedy & Campbell
Attorneys

United States Patent Office 3,364,006
Patented Jan. 16, 1968

3,364,006
OPPOSED BLASTHEAD APPARATUS FOR TOUGHENING SHEETS OF GLASS WITH SPACED VERTICAL DEFLECTING SHIELDS
Frederic W. Newell, Kenilworth, and Raymond J. Saunders, Birmingham, England, assignors to Pilkington Brothers Limited, Liverpool, England, a corporation of Great Britain
Filed June 10, 1964, Ser. No. 373,971
Claims priority, application Great Britain, June 11, 1963, 23,259/63
2 Claims. (Cl. 65—348)

ABSTRACT OF THE DISCLOSURE

Apparatus for quenching a glass sheet, intended for use as a vehicle windscreen, provided with a viewing zone surrounded by highly toughened glass, said viewing zone comprising bands of toughened glass of low particle count, the glass being heated to near softening temperature before quenching, said apparatus being characterised by a series of vertical bars located between the quenching elements and each face of the sheet when in position for tempering, the bars being connected and spaced apart in parallel relation by horizontal bars so that in the viewing zone alternate vertical bands of highly toughened and lesser toughened bands obtain, the highly toughened bands being intersected by strips of lesser toughened glass.

Disclosure

Figure 1:
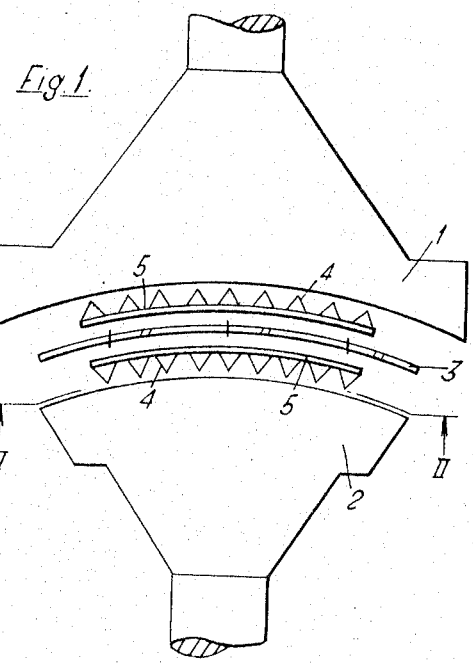

This invention relates to methods of and apparatus for toughening sheets of glass, such as are used, for example as automobile windscreens and backlights.

Glass is toughened by subjecting the glass when at a temperature near the softening point of the glass to a rapid chilling effected by directing jets (termed "quenching jets") usually of air, on to the glass. The degree of toughening achieved varies with the rate of chilling. The toughened glass comprises outer layers under compression which envelop glass in tension, hence the type of disintegration into small sections (termed "dicing") of toughened glass when the surface layer is fractured.

The basic requirements of a windscreen of toughened glass are that it shall be physically strong, free from severe optical distortion, and when broken shall exhibit a dicing type of fracture, while retaining reasonable visibility through it.

The particle or disc size is controlled by the stresses imposed on the glass by rapid quenching of it with jets of air from a substantially uniform temperature near to the softening point of the glass, the fiercer the quenching the smaller the general particle size formed. For maximum visibility on fracture, a low state of stress is required giving large particles, but such large particles in general have lower safety properties than fine particles. One method of obtaining maximum safety with maximum visibility is described and claimed in our U.K. Patent No. 944,505 filed February 13, 1959 whereby the greater part of the windscreen is stressed to give a comparatively high particle count, for example 80-150 per square of 2" side, over the greater part of its area whilst a small zone of it in front of the driver is stressed to give a lower particle count of, say 20-40 per square of 2" side when broken from a position remote from the zone. When corresponding glasses are broken from other positions, however, much larger particles, often well exceeding one square inch in area and with very irregular shapes, are frequently formed. Moreover there is a demand for a broader field of better vision, which can be afforded by larger zones of less highly stressed glass; but this increases the number of very large particles which may be formed on fracture.

A main object of the present invention is to produce a toughened glass windscreen having a fracture pattern comprising chains of predominantly large particles providing clear vision to a driver of the vehicle in which the windscreen is installed.

The present invention comprises apparatus for toughening glass sheet, comprising opposed relatively movable quenching means and means for presenting a heated glass sheet at a toughening station equidistant between said quenching means and air distributing means located on each side of the glass toughening station and equidistant therefrom, said air distributing means comprising a similar series of vertical strip-like members located to be opposite that part of the area of the glass intended to form a viewing zone by horizontal bars connecting the vertical bars in spaced parallel relation to intercept flow from the quenching means when the quenching means is moved up to the toughening station and thereby provide a cellular fracture pattern.

Preferably the vision area which has a stress pattern comprising small zones or strips of glass which are less toughened than the separate areas or strips of glass between them is surrounded by an area which may be a comparatively wide area of glass toughened to the substantial extent normally used in an automobile windscreen. The surrounding or ambient area of normally toughened glass may extend to all edges of the glass sheet or windscreen or alternatively the glass sheet may have included therein a further area having a stress pattern according to the invention.

According to one arrangement according to the invention, the less toughened regions are elongated in shape and comprise strips of glass, and desirably the regions which separate the less toughened regions are also elongated in shape and comprise strips of glass. As an example, the strips of glass which are less toughened may be 10" long by ¾" wide. The strips of glass which are more highly toughened will be narrower than the strips of less toughened glass, for example ¼" wide.

Accordingly the strips of glass run with their greater dimension in a direction from the top to the bottom of the glass sheet which is to form a windscreen, that is to say across the width of the glass sheet rather than parallel with its length.

Preferably the strips of less toughened glass are broken up by regions of more highly toughened glass at intervals along their length. Such regions of more highly toughened glass intersecting the strips of less toughened glass will occur without special steps being taken to obtain them owing to the disposition of the quenching jets and relative movement between the quenching jets and the glass sheet, but the regions of more highly toughened glass may be caused to form regularly by using strip-like members which have large notched portions regularly and similarly spaced on each of the members.

Conveniently the members which are interposed in the path of the gaseous chilling medium have a shaped cross section disposed concave to the surface of the glass sheet to interrupt the flow of the gaseous chilling medium by deflection thereof.

Modification of the stress pattern produced in the area of the glass sheet may also be obtained with a given set of members by coating the surfaces of the members facing the glass sheet, for example a reflecting coating may be applied to the surfaces of some or all of the members. Alternatively a heat absorptive coating may be applied.

When the strip-like members have a shaped cross section disposed concave to the surface of the glass sheet, the members may conveniently be comprised by angle bars and the gaseous chilling medium is then deflected over the face of the angle bar with the result that a lower rate of quenching of the glass shielded by the angle bars obtains. As an alternative, semi-circular hollow bars or hollow bars of other shapes arranged to be concave towards the glass surface can be used, while good results are also produced by simple flat bars.

The size of the regions of differently toughened glass and different particle counts between the regions of different degrees of toughening may be controlled by varying the size of the bars used, the included angle of the bars, if these are angular or cuspoid, or by varying the spacing between the bars themselves or the spacing between the bars and the glass sheet or between the bars and the nozzles or other means for directing jets of a chilling medium onto the surfaces of the glass sheet. Further variations may be obtained by altering the pressure at which the chilling medium is directed towards the glass or by blanking off the face and ends of the bars which are concave towards the hot glass or by the use of parallel bars in curved configurations.

The resultant fracture pattern from quenching by utilising apparatus according to the present invention will be a series of parallel bands of high particle count interspersed by regions which may be bands of low particle count, and the complete glass will have the characteristic dicing fracture of a safety glass. In the shielded zones large particles up to about one square inch in area without sharp cutting edges will be formed in a cellular type manner resulting in enhanced visibility, these particles being supported by the matrix of small particles in the adjacent bands.

Although the stress pattern in the zoned area of glass is primarily one of alternate highly stressed and less highly stressed bands, the larger particles formed on fracture by no means extend to the whole length of the bands, but are interrupted by multiple cross fractures at more or less regularly spaced intervals. It is thought that the formation of these cross fractures is influenced by slight irregularities in the stresses parallel to the general direction of the bars, such as will be formed by the motion, relative to the bars and the gaps between them, of the jets and quenching units which is imparted to the latter in order to distribute the quenching effects of the jets as evenly as possible over the surfaces of the glass to be quenched. However, as already mentioned, the formation of cross fractures may be more positively predetermined by the use of notches or cut-out portions on the edges of the strip-like members which interrupt the flow of gaseous chilling medium, or by the presence of other irregularities thereon, for example by recessing the strip-like members from the glass at intervals along their length.

It has already been mentioned that the pattern obtained may be further varied by providing on the surfaces of the strip-like members which face the surface of the glass a reflective coating or alternatively an absorptive coating. In particular an improved stress pattern may be obtained by providing that each strip-like member has, on its surface facing the surface of the glass sheet, alternate coatings of reflective and absorptive material along the length of the said member, thereby inducing the formation of cross fractures.

Alternatively the strip-like members on one side of the glass may be laid at a substantial angle, for example a right angle, to those on the other side of the glass; in this case the size and spacing of the first mentioned strip-like elements may be the same as or different from the size and spacing of the other strip-like elements or members. In this case the less highly stressed areas will be insular in character.

The presence of the highly stressed areas between the less highly stressed areas and the predisposition of the latter to form areas of cross fracture limit the size of any one particle which may be formed and the resultant fractured glass is a predominantly safe one, whilst adequate visibility is afforded through the numerous particles of comparatively large area.

By a suitable selection of the shape, size and disposition of the members which act as jet interruptors, highly toughened glass of the type described may be obtained with a negligible amount of visual distortion and be at least as strong as glass toughened with a single coarse-fracturing zone of larger area.

There may be one area or more than one area of glass in which the stress pattern is one of alternate strips of differently stressed glass, but it is generally desirable for a glass sheet to be used as an automobile windscreen that the marginal areas of the glass sheet shall be highly stressed.

The stress pattern may be obtained by arranging the jet-interrupting bars in pairs opposite to each other on opposite sides of the glass or by having jet-interruptors on one side of the glass only.

In order that the invention may be more clearly understood, a detailed description of preferred embodiments thereof is given by way of example with reference to the accompanying diagrammatic drawings in which:

FIGURE 1 is a plan view of apparatus according to the invention.

Figure 2:
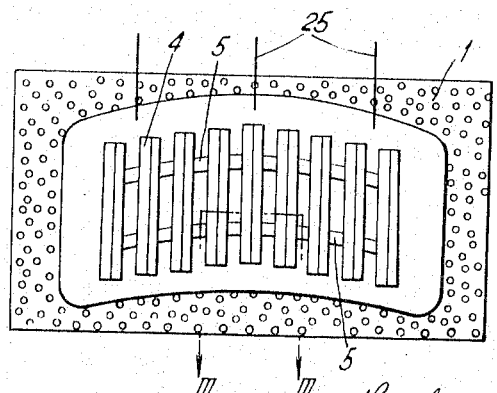
Figure 4A:
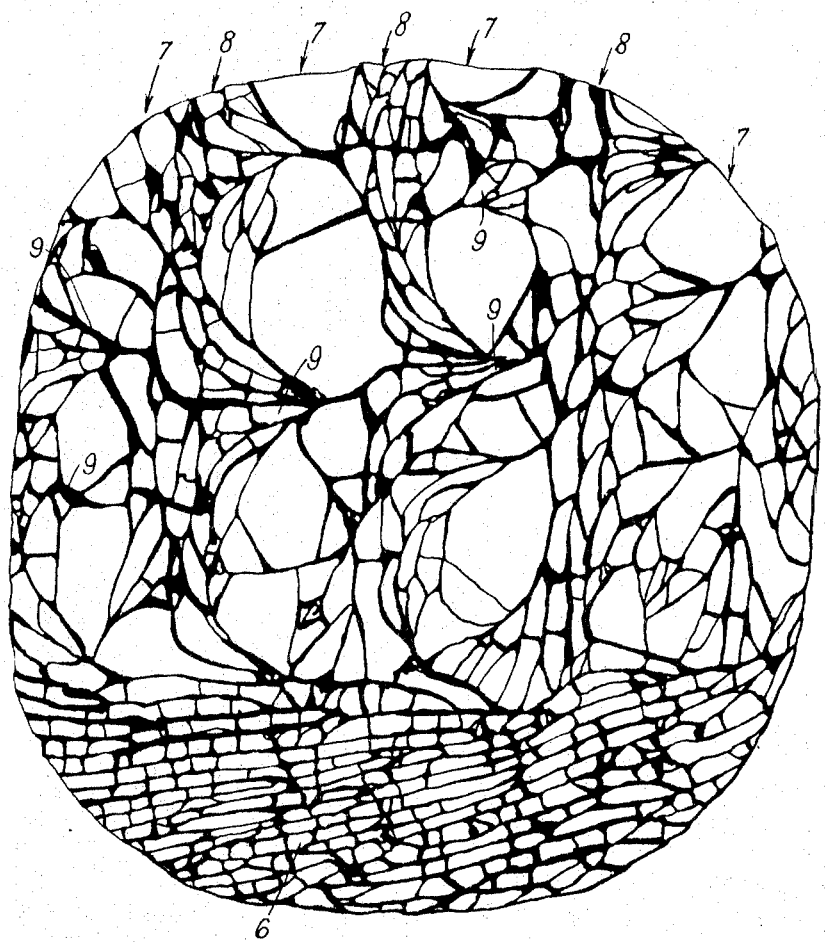
Figure 5:
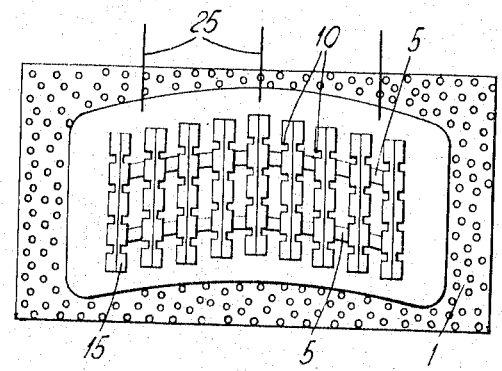
Figure 6:
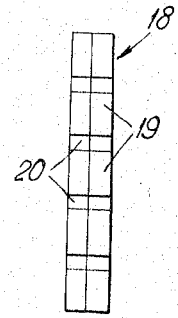

FIGURE 2 is a view of the apparatus according to FIGURE 1, including a heated glass sheet, the view being taken along the line II—II of FIGURE 1, FIGURE 3 is an enlarged sectional plan of part of the apparatus of FIGURES 1 and 2 taken along the line III—III in FIGURE 2, FIGURES 4 and 4A show examples of the fracture pattern obtained in the portion of the glass sheet below the line III—III of FIGURE 2, FIGURE 5 is a similar view to FIGURE 2 of modified apparatus according to the invention for obtaining a product which will yield a fracture pattern as indicated in FIGURE 4, and FIGURE 6 shows the surface of an angle bar facing the glass sheet and capable of use in the arrangement of FIGURE 2 to ensure production of a fracture pattern as shown in FIGURE 4.

In the drawings like reference numerals designate the same or similar parts.

In the drawings, and referring more particularly to FIGURES 1 to 3, there are shown opposed quenching units comprising air boxes 1 and 2 having their faces curved to conform with the curvature of a bent glass sheet 3 to be toughened between them. As indicated in FIGURE 2, the surfaces of the air boxes facing the glass sheet contain a considerable number of perforations or nozzles so that cold air may issue therefrom towards the heated glass sheet 3.

Interposed between the perforated faces of the air boxes 1 and 2 and the glass sheet 3 are two series of strip-like members comprised by angle bars 4 mounted on horizontal frames 5. The angle bars are comprised of metal one sixteenth of an inch thick and the two arms of the bar forming the angle are each about 1.25 inches in length. The angle bars 4 are mounted on the horizontal frames 5 so that there is a gap of approximately half an inch between the nearest parts of adjacent angle bars 4, and the whole series of angle bars 4 on their frames 5 are mounted so that the nearest points of the angle bars to the glass sheet are of the order of one eighth of an inch from the nearest surface of the glass sheet, which is suspended therebetween on supporting means such as tongs 25.

Air at ambient temperature is forced by fans into the air boxes 1 and 2 at a pressure of about 10″ to 12″ water gauge and the flow of the gaseous chilling air from the air boxes 1 and 2 towards the central part of the uniformly heated glass sheet 3 positioned between the air boxes is interrupted by deflection of the chilling air by the angle bars 4. Consequently a vision zone in the central area of the glass sheet is obtained.

In order to distribute the chilling effect of the jets as evenly as possible over the stationary angle bars or interruptors 4, and the heated glass sheet 3, the air boxes 1, 2 are given a small circuitous or oscillatory motion in a plane parallel to that of FIGURE 2.

When a glass sheet toughtened by a method according to the present invention and using the apparatus illustrated in FIGURES 1 to 3 of the drawings is fractured, a fracture pattern of the kind indicated in FIGURES 4 and 4A is produced. Around the marginal portions of the glass sheet which form the ambient glass sheet a high degree of toughening is present and therefore a high particle count is obtained as indicated by the portion 6 of the glass sheet. However, in the portion of the glass sheet which is subjected to the flow of a gaseous chilling medium modified by the presence of the angle bars 4, there are obtained vertical regions or strips 7 having a much lower particle count. These vertical strips 7 are separated from one another by narrower strips 8 having a particle count of the same order as the portion 6 of the glass sheet which is the ambient glass sheet.

A strip 7 in the glass sheet may be, from top to bottom, some eight inches in length and have a width of approximately three quarters of an inch, while the intervening strips 8 have a width of only about a quarter of an inch.

The particle count in the portion 6 of the glass is of the order of 30 per square inch, whilst the particle count in the strips 7 is of the order of 10 per square inch. The strips 7 are comprised of a number of larger particles having areas of the order of 1 square inch separated by areas of cross-fracture 9 having particles of a size comparable with the particles in portion 6. The strips 8, which separate the strips 7, are comprised of particles having a size comparable with the particles in portion 6.

If the frames 5 on which the angle bars 4 are mounted are made of metal of similar size to the angle bars 4 themselves, then the frames 5 will themselves shield a part of the surface of the glass sheet and may induce a region of lesser toughened glass extending at right angles to the strips 7 of lesser toughened glass, and breaking up the vertical strips 8 of more highly toughened glass which gives the higher particle count when fractured.

In FIGURE 5 there is shown a modified form of the apparatus of FIGURE 2 in which there are used angle bars 15 each of which is formed with regular notches or cut-out portions 10 so that the screen effect of the angle bars 4 is reduced at regular intervals along their length. The presence of the notches 10 assists in the formation of regular areas of cross-fracture 9 as indicated in FIGURE 4.

In FIGURE 6 there is shown a concave surface of an angle bar 18, that is to say the surface of the angle bar 18 which faces the heated glass sheet during the quenching operation. The surface of the angle bar 18 facing the heated glass sheet has thereon coatings 19 of reflective material, for example alumina alternating with coatings 20 of an absorbent material, for example chromium sesquioxide.

The parts of the glass directly opposite the absorbent coatings 20 will be much more quickly cooled than the portions of the glass opposite the reflective coatings 19. Consequently the vertical strips in the glass which have a lower particle count than the strips 8 will be broken up at regular intervals by the lines of fine particles 9 induced by the presence of similar arrangements of coatings 19 and 20 on each of the angle bars 18.

We claim:
1. Apparatus for toughening glass sheet, comprising opposed relatively movable quenching means and means for presenting a heated glass sheet at a toughening station equidistant between said quenching means and air distributing means located on each side of the glass toughening station and equidistant therefrom, said air distributing means comprising a similar series of vertical strip-like members located to be opposite that part of the area of the glass intended to form a viewing zone by horizontal bars connecting the vertical bars in spaced parallel relation to intercept flow from the quenching means when the quenching means is moved up to the toughening station and thereby provide a cellular fracture pattern, wherein the parallel strip-like members have a shaped cross-section disposed concave to the surface of the glass sheet and the surfaces facing the glass sheet carry alternate transverse coatings of reflective and absorbent material.

2. Apparatus according to claim 1, wherein the parallel strip-like members have regularly shaped cut-out portions along each of their edges.

References Cited
UNITED STATES PATENTS

| | | | |
|---|---|---|---|
| 2,213,405 | 9/1940 | Paddock | 65—349 |
| 2,298,709 | 10/1942 | Long | 65—348 |
| 3,174,840 | 3/1965 | Long | 65—351 X |

FOREIGN PATENTS 869,844   11/1941   France.

DONALL H. SYLVESTER, *Primary Examiner.*

A. D. KELLOGG, *Assistant Examiner.*